United States Patent [19]

Schumacher et al.

[11] Patent Number: 4,710,390

[45] Date of Patent: Dec. 1, 1987

[54] INGESTIBLE, HIGH DENSITY, COMPRESSED-TABLET FRUIT FIBER COMPOSITION

[75] Inventors: Robert W. Schumacher, Kenvil; Mary B. Houston, Morristown, both of N.J.

[73] Assignee: Warner-Lambert Company, Morris Plains, N.J.

[21] Appl. No.: 36,942

[22] Filed: Apr. 10, 1987

Related U.S. Application Data

[63] Continuation-in-part of Ser. No. 882,799, Jul. 7, 1986, Pat. No. 4,680,189.

[51] Int. Cl.$^4$ ............................................... A23L 1/29
[52] U.S. Cl. .................................... 426/285; 426/615; 426/454; 426/804; 426/658
[58] Field of Search ............... 426/285, 804, 658, 615, 426/454, 573, 577

[56] References Cited

U.S. PATENT DOCUMENTS

| | | |
|---|---|---|
| 4,143,163 | 3/1979 | Hutchison et al. ............... 426/96 |
| 4,393,086 | 7/1983 | Masuyama ........................ 426/804 |
| 4,401,682 | 8/1983 | Battista ............................. 426/454 |
| 4,565,702 | 1/1986 | Morley et al. ................... 426/93 |
| 4,619,831 | 10/1986 | Sharma ........................... 426/93 |

OTHER PUBLICATIONS

Remington's Pharmaceutical Science, 17th Edition, 1985, pp. 1610 to 1611.
Pharmaceutical Dosage Forms: Tablets, Marcel Dekker, Inc., New York, 1980, pp. 115 to 116.
Theory and Practice of Industrial Pharmacy, 2nd Edition, Lea & Febiger, Philadelphia, 1976, p. 337.

*Primary Examiner*—Jeanette Hunter
*Attorney, Agent, or Firm*—Daniel A. Scola, Jr.; Gary M. Nath

[57] ABSTRACT

An ingestible, high-density compressed-tablet fruit fiber composition having a high dietary fiber content is prepared by blending at least one fruit fiber source preferably apple fiber, having a maximum starch content of about 25%, with a microcrystalline cellulose compression aid; mixing water with the blend at a rate ratio of about 1.5:1 to about 2.5:1 based on the weight of water to the weight of the blend, for a time sufficient to form a cohesive, deformable, plastic mass; drying the plastic mass; milling the dried product to recover granules having a particle size of about 125 to about 840 microns; blending the granules with a tableting lubricant and compressing into a high-density, high fiber tablet. The low starch content provides for increased hardness and structural tablet integrity with less compressive force, thereby producing high quality tablets.

24 Claims, No Drawings

INGESTIBLE, HIGH DENSITY, COMPRESSED-TABLET FRUIT FIBER COMPOSITION

This application is a continuation-in-part of U.S. Ser. No. 882,799, filed July 7, 1986 now U.S. Pat. No. 4,680,189

FIELD OF THE INVENTION

The present invention relates to an ingestible, high density, compressed-tablet fiber-composition and method for the preparation thereof. More particularly, this invention relates to a high density, compressed-tablet fiber-composition prepared by controlling certain steps in a wet granulation tableting operation to permit the formation of a compressed tablet fiber composition having a high density and a high dietary fiber content, which is of sufficient hardness to withstand the mechanical abrasion encountered in packaging, shipping and use. This application differs from the related co-pending application referred to above in that it has now been discovered that apple fiber having a maximum starch content of about 25% by weight produces unusually good tablets. The compressed tablet composition of this invention may be prepared in swallowable or chewable form. The high density and high dietary fiber feature of the invention is especially advantageous in swallowable compressed tablets where the size of the tablet is necessarily limited. Chewable compressed tablets prepared according to the method of this invention have an advantage in that they are palatable and substantially free of the dry, dusty mouthfeel generally associated with dietary fiber products. Thus, the convenient form and pleasant taste of the high density, compressed-tablet fiber-composition prepared according to the method of this invention encourages consumers to adhere to recommended dietary programs.

BACKGROUND OF THE INVENTION

Since the early 1970's, the importance of fiber in health and disease has received an increasing amount of attention from consumers. Research to date has provided a body of evidence which enhances the role of fiber in human metabolism. In preventative medicine applications, fiber has been mentioned as having possible value in a variety of areas, among which there may be mentioned constipation, weight reduction, diverticulitis, cardiovascular disease, and cancer. As a result, considerable efforts have been expended in the development of fiber-containing foods and snacks. Although there are many physiological claims to the benefits of dietary fiber, since different fiber components have very different physiological functions, the daily level of dietary fiber recommended to achieve a particular physiological effect will vary with the type of fiber ingested. Additionally, since dietary fiber products characteristically have an unpleasant taste and mouthfeel, a relatively low amount of fiber is present in such products in relation to the other food or snack ingredients. Thus, ingestion of large amounts of currently available fiber-containing foods or snacks is generally required in order to attain a sufficient level of fiber within the body to achieve a particular physiological function.

Ideally, a tablet containing a high amount of dietary fiber which can be chewed or swallowed several times a day as, for example, before and after meals, would be most advantageous in maintaining a desired level of fiber in the diet. Attempts have been made in the past to prepare high-fiber tableted compositions. U.S. Pat. No. 4,565,702 discloses dietary food products which can be formed into gelatin tablets containing dietary fiber. Belgium Patent No. 881,168 discloses a high protein dietary product containing some fiber prepared in the form of a tablet, but this tablet is a heat-treated, molded article.

In a broad sense, tablets may be classified according to their method of manufacture, i.e., molded tablets or compressed tablets. Molded tablets or tablet triturates, originally made from moist materials in a triturate mold, can now usually be made on tablet machines, generally in small scale operations. Compressed tablets, on the other hand, are the most widely used dosage form since they are convenient to use, deliver the intended dose with a high degree of accuracy, and are capable of being produced by large scale processes. Among the methods for preparing compressed tablets, the wet granulation method is the most popular due to the increased probability that the granulation will meet all the physical requirements for compression into good tablets. Well made compressed tablets possess certain attributes, among which there may be mentioned sufficient strength to withstand handling and shipping prior to use, freedom from defects such as cracks and chipped edges, reasonable storage stability and the ability to release active ingredients in a reproducible and predictable manner. Thus, although much is known concerning the methods for obtaining high-quality compressed tablets, the prior art does not disclose the preparation of high-density, compressed-tablet fiber- compositions.

SUMMARY OF THE INVENTION

This invention relates to a method for preparing an ingestible, high-density, compressed-tablet fiber-composition having a high dietary fiber content. The compressed tablet is prepared by a unique modification of the traditional wet granulation procedure for preparing tablets. In particular, at least one high-fiber source is blended with a microcrystalline cellulose compression aid to form a homogenous blend. Water is then mixed with the blend in a weight ratio of about 1.5:1 to about 2.5:1, based on the weight of water to the weight of the blend, for a time sufficient to form a cohesive, deformable, plastic mass. The plastic mass is then dried to a moisture content of less than about 8% by weight, based on the weight of the dried material. The dried product is milled to recover granules having a particle size of about 125 to about 840 microns. The granules are then blended with a tableting lubricant and compressed into a high- density, fiber tablet having a dietary fiber content of about 30% to about 95% by weight, based on the total weight of the compressed-tablet fiber-composition. It is critical to the success of the invention that the above steps be followed in order to obtain a high-density compressed tablet having a high fiber content and appropriate hardness.

DETAILED DESCRIPTION OF THE INVENTION

The first step in the method for preparing the ingestible, high density, compressed-tablet fiber-composition in accordance with this invention involves the blending of at least one high fiber source with a microcrystalline cellulose compression aid to form a homogeneous blend. The term "blend" is meant to include the fiber from the high-fiber source and the microcrystalline cellulose. The term "dietary fiber" is understood to mean that part of plant material in the diet which is resistant to digestion by the secretions of the human gastrointestinal tract. Dietary fiber can consist of variable proportions of complex carbohydrates such as cellulose, pentosans, and uronic acids, as well as lignin. Fiber materials, wherein the dietary fiber content is at least 60%, preferably 70% or more, are suitable as the high-fiber source in the practice of this invention. A technique for determining dietary fiber content is described in "Total Dietary Fiber: AOAC Collaborative Study," January 25, 1982, incorporated herein by reference. This technique utilizes enzymatic and chemical procedures to isolate the dietary fiber. When a wheat bran or corn bran for example, is treated according to this AOAC method the recoverable dietary fiber is an insoluble fiber. The bran is first treated with a solvent, e.g., petroleum ether or hexane, to remove the fat. The defatted bran is then digested enzymatically with protease. Finally, the bran is treated with alpha or beta-amylase and amyloglucosidase. The recoverable material is protein-free, fat-free and carbohydrate-free insoluble dietary fiber. Thus the recovered material is essentially non-digestible fiber, free of any association or residue of digestibles.

In the initial blending with the microcrystalline cellulose, about 20% to about 90%, preferably about 20% to about 80%, most preferably about 25% to about 75% dietary fiber from the high fiber source, based on the total weight of the compressed-tablet fiber-composition, is included. It is desirable to utilize as the high fiber source in the practice of this invention, fiber derived from fruits and grains. Thus, fiber derived from the following materials: tree fruits including the apple, apricot, cherry, peach, pear, plum and the like; fiber derived from citrus fruits such as the lemon, lime, orange, grapefruit and the like; or fiber derived from bushberries, including the blackberry, raspberry, strawberry, blueberry and the like, are representative suitable fruit fiber sources. It has been surprisingly determined that certain fruit fibers, such as apple fiber, containing a maximum starch content of about 25% by weight of total apple fiber provides a harder, more durable tablet. Preferably the starch content of the fruit fiber is about 10 to about 20%. Although the precise reason for this is not completely understood, it is believed that higher than 25% starch contents result in a more brittle tablet. Although there are few commercially available fruit fibers other than apple are known to have a low starch content, other low starch fruit fibers are contemplated as useful in this invention.

Starch content in fruit varies as the fruit matures and ripens, whereby more starch is converted into carbohydrate. Thus, early harvested apples, for example, tend to have a higher starch content than late harvested apples. The particular variety of the fruit, of course, is not critical to the invention, providing the starch content is not greater than about 25% by weight of total fruit fiber. Apple fiber is the preferred fruit fiber due to its availability as a low starch-containing fruit. It has also been discovered, however, that the starch content in the fruit fiber, i.e. apple fiber must be naturally present to achieve the best tablet hardness. Attempts to artificially add or delete starch has not resulted in a structurally stronger or harder tablet. Thus, the maximum starch content must be attributed to that which is naturally present in the apple fiber.

Example VI and VII indicate that tablets made using apple fiber having a starch content of 25% or less, exhibit higher hardness values (SCU) than tablets made using apple fiber with higher starch contents (i.e. early harvest apples). These tablets were more resistant to chipping and exhibited good durability.

Fiber derived from cereal grains such as barley, corn (maize), oats, rice, rye and wheat, are representative suitable grain fiber sources which can be used in combination with the low starch fruit fiber. Fiber derived from other sources such as vegetable fiber and cellulose fiber are also suitable for use in the practice of this invention. Among the previously mentioned fiber sources, those having a high concentration of dietary fiber such as apple, pear, barley, oat, and corn fiber are particularly useful in combination with the low starch fruit fiber.

The microcrystalline cellulose compression aid which is blended with the high-fiber source is a purified, partially depolymerized cellulose prepared by treating alpha-cellulose obtained as pulp from fibrous plant material with mineral acids, as is more fully described in the Official Monographs of the United States Pharmacopia. Microcrystalline cellulose in amounts of about 5% to about 75%, preferably about 7% to about 50% by weight, based on the total weight of the compressed-tablet fiber-composition, is sufficient to function as a compression aid. Since the microcrystalline cellulose is considered a fiber, it also serves, in the method of this invention, as both a compression aid during the formation of the compressed tablet and as a fiber. Thus, the total dietary fiber content of the tableted composition of this invention, including dietary fiber from the high fiber source and from the microcrystalline cellulose compression aid ingredient, is about 30% to about 95%, preferably from about 35% to about 90%, by weight, based on the total weight of the compressed-tablet fiber-composition.

Following the blending of the high-fiber source and the microcrystalline cellulose compression aid, water is mixed with the blend. A traditional wet granulation procedure, as described in Remington's Pharmaceutical Science, 17th Edition, 1985, involves weighing, mixing, granulation, screening the damp mass, drying, dry screening, lubrication and compression. Following weighing and mixing, a solution of a binding agent is added to the mixed powders. The powder mass is wetted with the binding solution until the mass has the consistency of damp snow or brown sugar. If the granulation is over-wetted, the granules will be hard, requiring considerable pressure to form tablets, and the resultant tablets will have a mottled appearance. If the powder mixture is not wetted sufficiently, the resulting granules will be too soft, breaking down during lubrication and causing difficulty during compression.

Other references have characterized the end point in the wet granulation process somewhat differently. For example, in Volume 1 of "Pharmaceutical Dosage Forms: Tablets," published by Marcel Dekker, Inc., New York, 1980, the end point is described as follows: the wet mass produced by mixing a liquid with the solid ingredients should have a dough-like consistency so that a handful can be formed into a shape without crumbling. When pressed into a ball with the hands and broken in half, the wet mass should give a clean fracture without sticking or crumbling. If the mass has a tendency to stick or not break clean, the granulation is usually too wet. If the mass crumbles or breaks into pieces, it is too dry. In the "Theory and Practice of Industrial Pharmacy", 2nd Edition, published by Lea Febiger, Philadelphia, 1976, it is stated that a rough way to determine the end point in a wet granulation process is to press a portion of the wet mass in the palm of the hand and if the ball crumbles under moderate pressure, the mixture is ready for the next stage in processing, which is wet screening.

Quite surprisingly, it has been found that in the practice of the subject invention, it is necessary to go beyond the above described end-points in the wet granulation process in order to obtain, as a final product, a compressed tablet having suitable density and hardness. More particularly, water is mixed with the blend of the high-fiber source and the microcrystalline cellulose compression aid at a weight ratio of about 1.5:1 to about 2.5:1, based on the weight of water to the weight of the blend, for a time sufficient to form a cohesive, deformable, plastic mass. The plastic mass obtained would be considered over-wetted in terms of the aforementioned end point description as damp snow or brown sugar. Moreover, if the over-wetted plastic mass of this invention is pressed into a ball and broken in half, it does not give a clean fracture nor does it crumble. Rather, the plastic mass is deformable and tears apart rather than breaking apart with a clean fracture. Thus, the cohesive, deformable, plastic mass of this invention, which is over-wetted in terms of a traditional wet granulation process, is formed by adding water to the dry blend in the above stated ratio and mixing until the desired critical physical form is obtained. As seen in comparative Examples IV and V, if the weight ratio of water to the blend is above or below 1.5:1 to 2.5:1, tablets of insufficient hardness are obtained. The mixing time is also critical in that, if mixing is continued beyond the formation of the cohesive, deformable, plastic mass, heat is built up, water is lost through evaporation, and the mass becomes too dry. The length of mixing time depends to a large extent on the efficiency of the mixing apparatus being used, but must be continued until the desired physical form, as described above, is obtained. Generally, mixing times of about 10 to about 40 minutes, preferably about 15 to about 25 minutes, depending upon the type of mixing equipment is used, have been found to be suitable to obtain the desired physical form.

At this point in a traditional wet granulation process, the granulation is wet screened to obtain coarse, granular aggregates which are then dried. Quite surprisingly, it has been discovered that the wet screening step used in traditional wet granulation processes is not essential to the practice of this invention. Rather, the over-wetted cohesive, deformable, plastic mass is dried directly, without wet screening, to a moisture content of less than about 8%, preferably less than about 5%, by weight, based on the weight of the dried material. The elimination of the time-consuming, expensive wet screening step provides a considerable advantage in large scale commercial tableting operations. However, the wet screening step of the traditional wet granulation process may be included in the method of this invention, in which case the wet screened granules are also dried to the above stated moisture content. In either case, the dried product is then milled to recover granules having a particle size of from about 125 to about 840 microns. For the preparation of chewable tablets wherein taste is a consideration, the granules should have a particle size of about 210 to about 840 microns, preferably about 250 to about 840 microns. In the preparation of a swallowable tablet where bulk density, compressability and tablet size are the primary considerations, milling to recover granules having a particle size of about 125 to about 710 microns, preferably about 149 to about 590 microns is desired.

The next step in the method of preparing the ingestible, high density, compressed-tablet fiber-composition in accordance with this invention is the blending of a tableting lubricant with the aforementioned milled granules. Traditionally, lubricants are added to tablet granulations for a number of reasons, including to improve the rate of flow of the tablet granulation, to limit the wear on dies and punches, to prevent adhesion of the tablet material to the surface of the dies and punches, to reduce interparticle friction, and to facilitate the ejection of tablets from the die cavity. The lubricants useful in the method and compositions of this invention are among those well-known in the art. Representative examples of such lubricants include stearic acid, metallic stearates, hydrogenated vegetable oils, partially hydrogenated vegetable oils, animal fats (e.g. triglycerides), modified maltodextrins, polyethylene glycol, light mineral oil, sodium benzoate and mixtures thereof. Among aforementioned lubricants, stearic acid, hydrogenated vegetable oils, partially hydrogenated vegetable oils, animal fats and modified maltodextrins are preferred. The quantity of lubricant used in the method of this invention will vary with the lubricant selected and with the fiber composition being tableted. Generally, from about 0.01% to about 5%, preferably about 0.05% to about 3.5%, by weight of lubricant, based on the total weight of the compressed-tablet fiber-composition, has been found to be sufficient to facilitate tableting operations in the method of this invention. In an alternate embodiment of the method of this invention, a portion of the tablet lubricant may be added to the initial blend of the high fiber source and the microcrystalline cellulose, with the remainder of the tablet lubricant being mixed with the milled granules just prior to compression into tablet form.

As a final step in the method of this invention, the blend of the tablet lubricant and granules of high fiber source and microcrystalline cellulose are compressed into tablet form, following conventional tableting techniques well-known in the art. The basic mechanical unit in tablet compression involves the operation of two steel punches within a steel die cavity. The tablet is formed by the pressure exerted on the granulation by the punches within the die cavity. The tablet assumes the size and shape of the punches and die used. The simplest tableting machines available are those having a single punch design which produce one tablet at a time. The majority of single punch tablet machines are power-driven and heavier models are capable of high pressures. For increased production, rotary tablet machines offer great advantages. A head carrying a number of sets of punches and dies revolves continuously while the tablet granulation runs from the hopper through a feed frame and into the dies placed in a large, steel plate revolving under the feed frame. Compression takes place as the upper and lower punches pass between a pair of rollers. This action produces a slow squeezing effect on the material in the die cavity from the top and bottom and thus providing an opportunity for entrapped air to escape. Adjustments for the tablet weight and hardness can be made. High-speed rotary tablet machines capable of compressing tablets at high production rates are commercially available.

The resistance of a tablet to chipping, abrasion, or breakage under the conditions of storage, transportation, and handling before usage depends on the hardness of the tablet. The Strong-Cobb hardness tester measures the diametrically applied force required to break a tablet. In this instrument, the force is produced by a manually operated air pump. As the pressure is increased, a plunger is forced against a tablet placed on an anvil. The final breaking point is indicated on a dial calibrated to 30 arbitrary units, i.e., Strong-Cobb Units (SCU).

In accordance with the method of this invention, ingestible, high-density, compressed-tablet fiber-compositions are obtained having a hardness of about 10 to about 28, preferably about 11 to about 22 Strong-Cobb Units. Chewable compressed tablets prepared in accordance with the method of this invention preferably have a minimum hardness of at least about 11 Strong-Cobb Units, while swallowable compressed tablets prepared in accordance with the method of this invention preferably have a minimum hardness of at least about 15 Strong-Cobb Units. Higher Strong-Cobb values indicate greater tablet hardness. The instant low starch-containing apple fiber tablets having the required starch content exhibited hardness values (SCU's) of two (2) to four (4) times those of high starch-containing apple fiber tablets when direct compression tablet-forming techniques were used and about a 30% increase in tablet hardness when wet granulation techniques were employed. The inventive tablets were easier to compress in that they yielded harded tablets per a given compressibility force.

The chewable high density, compressed-tablet fiber-composition of this invention preferably also contains at least one flavoring agent. Flavoring agents well-known in the food and confection art may be added to the fiber compositions of the instant invention. These flavoring agents may be chosen from synthetic flavor oils and/or those derived from natural fruits, plants, leaves, flowers, and so forth, and combinations thereof. Representative flavors are artificial, natural or synthetic fruit flavors such as citrus oil including lemon, orange, grape, lime and grapefruit and fruit essences including apple, apricot, strawberry, cherry, pineapple and so forth. Also useful are flavor oils such as spearmint oil, cinnamon oil, oil of wintergreen (methylsalicylate) and peppermint oils. The amount of flavoring agent employed is normally a matter of preference, subject to such factors as flavor type, base type and strength desired. In general, amounts of about 0.05% to about 5.0% by weight of the total compressed tablet composition are useable, with amounts of about 0.3% to about 2.5% being preferred and amounts of about 0 7% to about 2.0% being most preferred.

Chewable compressed tablets prepared in accordance with the method of this invention preferably contain at least one sweetening agent. The sweetening agent may be selected from a wide range of materials, including water-soluble sweetening agents, water-soluble artificial sweeteners, and dipeptide based sweeteners, including mixtures thereof. Without being limited to particular sweeteners, representative illustrations encompass A. Water-soluble sweetening agents such as monosaccharides, disaccharides, and polysaccharides such as xylose, ribose, glucose, mannose, galactose, fructose, dextrose, sucrose, maltose, partially hydrolyzed starch or corn syrup solids and sugar alcohols such as sorbitol, xylitol, mannitol and mixtures thereof.

B. Water-soluble artificial sweeteners such as the soluble saccharin salts, i.e., sodium or calcium saccharin salts, cyclamate salts, acesulfam-K and the like, and the free acid form of saccharin.

C. Dipeptide based sweeteners such as L-aspartyl-L-phenylalanine methyl ester and materials described in U.S. Pat. No. 3,492,131 and the like. In general, the amount of sweetener is primarily a matter of taste preference and will vary with the sweetener selected and with the fiber ingredients in the composition being tableted. This amount will normally be about 0.01% to about 90% by weight, depending on whether a natural or artificial sweetener is used. The water-soluble sweeteners described in category A above are preferably used in amounts of about 25% to about 75% by weight, and most preferably from about 50% to about 65% by weight of the final high-density fiber compressed tablet composition. In contrast, the artificial sweeteners described in categories B and C above are generally used in amounts of about 0.005% to about 5.0%, most preferably about 0.05% to about 2.5% by weight, of the final compressed tablet composition. These amounts are ordinarily necessary to achieve a desired level of sweetness independent from the flavor level achieved from flavoring agents.

If a sweetening agent having a degree of bulk, such as one or more of those described in Category A above is used, it is preferable to include such sweetener with the initial blend of the high-fiber source and the microcrystalline cellulose at the beginning of the wet granulation process. Artificial sweeteners such as those described in Category B above may also be added with the initial blend. However, if an artificial sweetener, such as one of those described in Category C above is used, it is preferable to blend such sweetener with the tablet lubricant and flavor prior to the tablet compresssion operation.

One preferred inventive composition comprises in addition to the low starch-content apple fiber, additives which enhance palatability of the fiberous mouthfeel, as well as food acidulents for increased salvation. Examples of palatability enhancers include such materials as stearic acid, as well as other waxy materials such as beeswax, paraffin, microcrystalline wax, carbo wax and mixtures thereof. Examples of useful acidulents include food grade acids such as malic, citric, fumaric, adipic, tartaric, succinic and mixtures thereof. Although these materials are not critical to the main focus of the invention, they improve the overall organoleptic properties of the final fiber tablet.

The advantages of the instant invention can be further appreciated by reference to the following examples. These examples are intended to illustrate preferred embodiments and are by no means intended to limit the effective scope of the claims. All percents are by weight of the final high density, compressed-tablet fiber-composition unless otherwise specified.

Example I

Swallowable Tablet

Dry blend 800 grams of corn bran (75% dietary fiber), 320 grams of microcrystalline cellulose and 480 grams of apple fiber (60% dietary fiber). Add a quantity of water equal to 2½ times the weight of the blend (4,000 grams of water). Using a planetary mixer, mix until a cohesive, deformable, plastic mass is formed (about 20-25 minutes). Wet screen using an 8 mesh screen (U.S. Standard), dry the granules until the moisture content is less than 4% loss on drying. Mill the dried product using a 30 mesh screen (U.S. Standard). Using a rotary tablet machine and 0.380 inch by 0.625 inch elliptical tooling, form 0.765 gram tablets at a maximum pressure of 5 tons. Each tablet obtained contains 73.2% total dietary fiber and has a hardness of 18-20 Strong-Cobb Units.

EXAMPLE II

Chewable Tablets

Place 3.42 kilograms of corn bran (75% dietary fiber), 1.37 kilograms of microcrystalline cellulose, 2.06 kilograms of apple fiber (60% dietary fiber), 6.85 kilograms of dextrose and 6.85 grams of stearic acid in a high intensity mixer and mix for 5 minutes. Slowly add 13.7 kilograms of water over an 8 minute period while mixing. Continue mixing until a cohesive, deformable, plastic mass is obtained (about 8 minutes). Dry in a forced draft oven at 80° C. to a moisture content of less than 4% loss on drying. Mill using 6-10 mesh screen (U.S. Standard) to obtain granules having a particle size of predominantly 70 mesh or coarser and place in a planetary mixer. Add 327.6 grams of spray dried fruit flavor and 5.6 grams of stearic acid and mix for 5 minutes. Form tablets using a rotary tablet press and 27/32 inch flat faced, beveled edged tooling at a maximum pressure of 5-6 tons. Tablets of 2.82 grams each are obtained having a dietary fiber content of 36% and a hardness of 16-18 Strong-Cobb Units.

EXAMPLE III

Chewable Tablets

Using a high intensity mixer mix 3500 grams of corn bran (75% dietary fiber), 1396 grams of microcrystalline cellulose, 2104 grams of apple fiber (60% dietary fiber), and 7000 grams of dextrose for 2 minutes. Add 12,800 grams of water and mix until a cohesive, deformable, plastic mass is formed (about 10-15 minutes). Dry for 10-12 hours at 65°-75° C. in a forced draft oven (moisture content 0.5% loss on drying.) Mill and separate the finer than 60 mesh material from the coarser than 60 mesh material. Place 2752 grams of the coarser than 60 mesh material into a planetary mixer, blend with 65.96 grams of spray dried fruit flavor for 2-3 minutes. Add 2.5 grams of stearic acid and mix for 1-2 minutes. Form tablets using a rotary tablet press and 27/32 inch flat faced, beveled edge tooling, at a maximum pressure of 9-10 tons. Tablets of 2.75 grams each are obtained having a dietary fiber content of 36% and a hardness of 23-25 Strong-Cobb Units.

COMPARATIVE EXAMPLE IV

Chewable Tablets

Using a high intensity mixer mix 3500 grams of corn bran (75% dietary fiber), 1396 grams of microcrystalline cellulose, 2104 grams of apple fiber (60% dietary fiber), and 7000 grams of dextrose for 2 minutes. Add 18,000 grams of water and mix until a wet paste is formed (about 10-15 minutes). Dry for 10-12 hours at 65°-75° C. in a forced draft oven (moisture content 0.5% loss on drying) Mill and separate the finer than 60 mesh material from the coarser than 60 mesh material. Place 2752 grams of the coarser than 60 mesh material into a planetary mixer, blend with 65.96 grams of spray dried fruit flavor for 2-3 minutes. Add 2.5 grams of stearic acid and mix for 1-2 minutes. Form tablets using a rotary tablet press and 27/32 inch flat faced, beveled edge tooling, at maximum pressure of 9-10 tons. Tablets of 2.75 grams each having a dietary fiber content of 36% and a hardness of only 5-7 Strong-Cobb Units are obtained.

COMPARATIVE EXAMPLE V

Chewable Tablets

Using a high intensity mixer mix 3500 grams of corn bran (75% dietary fiber), 1396 grams of microcrystalline cellulose, 2104 grams of apple fiber (60% dietary fiber), and 7000 grams of dextrose for 2 minutes. Add 6000 grams of water and mix until a consistency similar to damp snow is obtained (about 10-15 minutes). Dry for 10-12 hours at 65°-75° C. in a forced draft oven (moisture content 0.5% loss on drying.) Mill and separate the finer than 60 mesh material from the coarser than 60 mesh material. Place 2752 grams of the coarser than 60 mesh material, into a planetary mixer, blend with 65.96 grams of spray dried fruit flavor for 2-3 minutes. Add 2.5 grams of stearic acid and mix for 1-2 minutes. Form tablets using a rotary tablet press and 27/32 inch flat faced, beveled edge tooling at maximum pressure of 9-10 tons. Tablets of 2.75 grams each having a dietary fiber content of 36% and a hardness of only 8-9 Strong-Cobb Units are obtained.

EXAMPLE VI

This Example is intended to demonstrate the effect of increased tablet hardness when apple fiber having a maximum starch content of 25% by weight of the total apple fiber content is used. Both direct compression techniques and wet granulation methods were tested, the results of both indicating hard tablets and ease of compressibility is related to low starch content.

Batches of apple fiber were dry blended with about 30% by weight of a diluent (dextrose) and about 2% of a palatability enhancer (stearic acid). Certain batches comprised early harvest, low starch-containing apple fiber (less than 25%), while other batches comprised high starch-containing apple fiber (greater than 25%). All tablets were formed using a 27/32" diameter punch and a stokes DS3 press at the maximum punch fill capacity (1.9-2.5 g/tablets) at 9-10 tons of pressure. The tablet hardness formed under these conditions using the inventive compositions is indicative of the case of tablet formation, since tablets which easily chip or fall apart typically have very low hardness values.

TABLE I

| | Comparative Examples Low Starch/High Starch Apple Fiber | | |
|---|---|---|---|
| Tablet | % Starch | Description | Hardness* |
| Inventive Run A | 10% | Late harvest | 24-28 |
| Inventive Run B | 10.2% | Late harvest | 24-28 |
| Comparative Run R | 28% | Early harvest | 7-9 |
| Comparative Run F | 36% | Early harvest | 16-20 |

*Each run represents an average of approximately 10 tests. tablets. Hardness values are given over the range of tablets tested.

The results, listed above, clearly indicate that the tablets comprised of the low starch-containing fiber exhibited significantly higher hardness values than those tablets having starch-containing fibers.

EXAMPLE VII

The following example demonstrates the difference in tablet hardness and integrity between low starch-containing apple fiber tablets and high starch-containing apple fiber tablets using wet granulation tablet techniques.

Low Starch-Containing Apple Fiber Tablets

Using a planetary mixer, 840 gs of corn bran (75% dietary fiber), 335 gms of microcrystalline cellulose, 505 gms of apple fiber (60% D.F. and 10% starch) and 1680 gms of dextrose were mixed for 2-3 minutes at low speed. To this, 3100 mls of water and were mixed at medium speed until a cohesive, deformable, plastic mass was formed (about 25 minutes). The mixture is then dried for 16 hours at 90° C. in a forced draft oven. The dried material was then milled using a 16 mesh screen (U.S. standard). The mixture of 1374 gms of the milled, granulated material was then blended with 24 gms of stearic acid for 1-2 minutes in a planetary mixer at low speed. Tablets were formed from the resultant mixture using a rotary tablet press and 27/32 inch flat-faced, beveled edged tooling at a maximum pressure of about 9-10 tons. The tablets had the following physical parameters:

Mean weight (20 tablets)
$\bar{x} = 2.81 \pm 0.017$ gms/tablet
Mean thickness (20 tablets)
$\bar{x} = 0.250 \pm 0.0014$ inches
Mean hardness (20 tablets)
$\bar{x} = 17.1 \pm 1.07$ S.C.U.

High Starch-Containing Apple-Fiber Tablets

Using the above identical procedure and relative component amounts of low starch tablets, tablets were formed from high starch-(36% starch, 60% dietary fiber) containing apple fiber. These tablets had the following physical characteristics:

Mean weight (20 tablets)
$\bar{x} = 2.81$ gms $\pm 0.019$ gms/tablet
Mean thickness (20 tablets)
$\bar{x} = 0.257 \pm 0.0032$ inches
Mean hardness (20 tablets)
$\bar{x} = 12.7 \pm 1.5$ S.C.U.

The invention being thus described, it will be obvious that the same may be varied in many ways. Such variations are not to be regarded as a departure from the spirit of scope of the invention and all such modifications are intended to be included within the scope of the claims.

What is claimed is:

1. A method for preparing an ingestible, high density, compressed-tablet fruit fiber-composition which comprises:
   (A) blending at least one fruit fiber source having a maximum starch content of about 25% by weight of said fruit fiber and a microcrystalline cellulose compression aid to form a homogenous blend;
   (B) mixing water with the blend of step (A) at a weight ratio of about 1.5:1 to about 2.5:1, based on the weight of water to the weight of the blend, for a time sufficient to form a cohesive, deformable, plastic mass;
   (C) drying the plastic mass of step (B) to a moisture content of less than about 8% by weight, based on the weight of the dried material;
   (D) milling the dried product of step (C) to recover granules having a particle size of about 125 to about 840 microns;
   (E) blending the granules of step (D) with a tableting lubricant; and
   (F) compressing the composition of step (E) into a tablet to form a high density, fruit fiber tablet containing about 30% to about 95% dietary fiber, based on the total weight of the compressed-tablet fruit-composition.

2. A method according to claim 1 wherein, in step (A), the dietary fiber from the high fiber source is present in amounts of about 20% to about 90% by weight, based on the total weight of the compressed-tablet fruit fiber-composition.

3. A method according to claim 2 wherein, in step (A), the high fiber source additionally includes a fiber selected from the group consisting of other fruit fibers and grain fibers.

4. A method according to claim 3, wherein, in step (A), the fruit fiber source is apple fiber.

5. A method according to claim 2 wherein, in step (A), the microcrystalline cellulose is present in amounts of about 5% to about 75% by weight, based on the total weight of the compressed-tablet fruit fiber-composition.

6. A method according to claim 5 wherein, in step (D), the dried product is milled to recover granules having a particle size of about 125 to about 710 microns.

7. A method according to claim 5 wherein, in step (A), a sweetening agent is additionally present.

8. A method according to claim 7 wherein, in step (D), the dried product is milled to obtain granules having a particle size of about 210 to about 840 microns.

9. A method according to claim 7 wherein, in step (E), at least one flavor is additionally present.

10. A method according to claim 1 wherein, in step (A), the fruit fiber source is a combined with corn fiber, the dietary fiber from both fiber sources is present in amounts of about 20% to about 80% by weight; and the microcrystalline cellulose is present in amounts of about 7% to about 50% by weight, based on the total weight of the compressed-tablet fiber-composition.

11. A method according to claim 10 wherein, in step (D), the dried product is milled to recover granules having a particle size of 149 to 590 microns.

12. A method according to claim 10 wherein, in step (D), the dried product is milled to recover granules having a particle size of about 250 to 840 microns.

13. A method according to claim 10 wherein, in step (F), a high density fiber tablet containing about 35% to about 90% dietary fiber is formed based on the total weight of the compressed-tablet fiber-composition.

14. An ingestible, high density, compressed-tablet fruit fiber-composition prepared by:
   (A) blending at least one fruit fiber source containing a maximum starch content of about 25% by weight of the fruit fiber and a microcrystalline cellulose compression aid to form a homogenous blend;
   (B) mixing water with the blend of step (A) at a weight ratio of about 1.5:1 to about 2.5:1, based on the weight of water to the weight of the blend, for a time sufficient to form a cohesive, deformable, plastic mass;
   (C) drying the plastic mass of step (B) to a moisture content of less than about 8% by weight, based on the weight of the dried material;
   (D) milling the dried product of step (C) to recover granules having a particle size of about 125 to about 840 microns;
   (E) blending the granules of step (D) with a tableting lubricant; and
   (F) compressing the composition of step (E) into a tablet to form a high density fruit fiber tablet containing about 30% to about 95% dietary fiber, based on the total weight of the compressed-tablet fruit fiber-composition.

15. An ingestible, high density, compressed-tablet, fruit fiber composition according to claim 14 wherein, in step (A), the dietary fiber from the fruit fiber source is apple fiber present in amounts of about 20% to about 80% by weight, based on the total weight of the compressed-tablet fruit-fiber composition.

16. An ingestible, high density, compressed-tablet, fruit fiber composition according to claim 15 in step (A), the apple fiber source is combined with a material selected from the group consisting of fruit fibers and grain fibers.

17. An ingestible, high density, compressed-tablet, fruit fiber composition, according to claim 16 wherein, in step (A), the apple fiber source is a combined with corn fiber.

18. An ingestible, high density tablet according to claim 15 wherein in step (A) there is included a material selected from the group consisting of a food grade acidulent and a palatability enhancer selected from the group consisting of food grade waxes, and mixtures thereof.

19. An ingestible, high density, compressed-tablet, fruit fiber composition according to claim 15 wherein, in step (A), the microcrystalline cellulose is present in amounts of about 5% to about 75% by weight, based on the total weight of the compressed-tablet fiber-composition.

20. An ingestible, high density, compressed-tablet, fruit fiber composition according to claim 18 wherein, in step (D), the dried product is milled to recover granules having a particle size of about 125 to about 710 microns.

21. An ingestible, high density, compressed-tablet, fruit fiber composition according to claim 18 wherein, in step (A), a sweetening agent is additionally present.

22. An ingestible, high density, compressed-tablet, fruit fiber composition according to claim 20 wherein, in step (D), the dried product is milled to obtain granules having a particle size of about 210 to about 840 microns.

23. An ingestible, high density, compressed-tablet, apple fiber composition according to claim 20 wherein, in step (E), at least one flavor is additionally present.

24. An ingestible, high density, compressed-tablet, fruit fiber composition, according to claim 22 having a hardness value of at least 22 Strong Cobb Units.

* * * * *